United States Patent [19]

Yamamoto et al.

[11] Patent Number: 5,118,541
[45] Date of Patent: Jun. 2, 1992

[54] ERASABLE OPTICAL DISK MEDIA AND METHOD OF RECORDING/ERASING THE SAME

[75] Inventors: Osamu Yamamoto, Osaka; Katsuji Hattori, Takarazuka; Hirotoshi Niguchi, Kashihara, all of Japan

[73] Assignee: Matsushita Electric Industrial Co., Ltd., Osaka, Japan

[21] Appl. No.: 507,841

[22] Filed: Apr. 12, 1990

[30] Foreign Application Priority Data

Jun. 19, 1989 [JP] Japan ................... 1-156527

[51] Int. Cl.⁵ .............................................. B32B 3/02
[52] U.S. Cl. .......................................... 428/64; 428/65;
428/76; 428/412; 428/698; 428/913; 428/914;
428/688; 369/284; 369/288; 430/945; 346/76 L; 346/135.1
[58] Field of Search ................... 428/64, 65, 76, 412,
428/688, 698, 913, 914; 369/284, 288; 430/945;
346/76 L, 135.1

[56] References Cited

U.S. PATENT DOCUMENTS

| 4,371,954 | 2/1983 | Cornet ......................... 369/275 |
| 4,825,430 | 4/1989 | Halter et al. ................. 369/275 |
| 4,896,314 | 1/1990 | Skiens et al. ................ 369/284 |

FOREIGN PATENT DOCUMENTS

| 56-124136 | 9/1981 | Japan . |
| 60-69846 | 4/1985 | Japan . |
| 60-253035 | 12/1985 | Japan . |
| 276724 | 11/1988 | Japan . |

OTHER PUBLICATIONS

Aisenberg, S. and Chabot, R., "Ion-Beam Deposition of Thin Films of Diamondlike Carbon", *Journal of Applied Physics*, vol. 42, No. 7, pp. 2953-2958 (Jun. 1971).
Aisenberg, S., "Properties and Applications of Diamondlike Carbon Films", *J. Vac. Sci. Technol.*, vol. A2, No. 2, p. 369 (Apr.-Jun. 1984).
Mitani, T., Yonezawa, T. and Kurokawa, H., "Application of Diamond Like Carbon Films to the Magnetic Recording Media", (Japanese Publication) vol. 14, No. 3, pp. 95-101 (May 5).
Namba, Y., "Diamondlike Carbon Films Prepared by Charged Particles", (Japanese Publication), p. 108 (1984).
"Current Condition and Trend of Optical Disk Recording Materials", by M. Kobukata et al., Optronics (1987), No. 12.
"Technology Highlights", Optical Data, Inc.; T. Jasionowsky, Mar. 11, 1988.
"Erasable Laser Recording in an Organic Dye-Binder Optical Disk Medium", by M. C. Gupta et al.; J. Appl. Phys. 60(8), 15 Oct. 1986; pp. 2932-2937.
"Review of Diamond Coating" by N. Fujinori et al.; Ceramics 21 (1986) No. 6.

*Primary Examiner*—Patrick J. Ryan
*Attorney, Agent, or Firm*—Lowe, Price, LeBlanc & Becker

[57] ABSTRACT

Erasable optical disk media basically comprise a double layer structure composed of a thermal expansion layer formed of an organic dye and a binder, and a retention layer of metal. In the recording process, the thermal expansion layer is heated to form a dome-like pit in the retention layer. The reproducing process is performed by reading differences in reflectivity from the pit and an area surrounding the pit. In the erasing process, the retention layer including the pit is heated to flatten the same under the tensile stress (residual stress) acting on the thermal expansion layer. The pit size is kept in a stable condition during the recording and reproducing processes, while the erasing can be performed completely without leaving partly erased traces. The erasable optical disk media of the foregoing construction are highly durable and resistant to heat.

14 Claims, 7 Drawing Sheets

ERASABLE OPTICAL DISK MEDIA AND METHOD OF RECORDING/ERASING THE SAME

BACKGROUND OF THE INVENTION

1. Field of the Invention

The present invention relates to erasable optical disk media used as data files or digital audio disks for recording (writing), reproducing (reading) and erasing digital information by a light beam. It also relates to a method of recording/erasing for such erasable optical disk media.

2. Description of the Prior Art

In recent years, optical disks have been applied to various uses such as data files as they have the advantage of a high density, a large capacity, a high access speed, etc.

The optical disks are generally classified into three types: "Read-only" disks in which instructions or data are permanently stored and the stored information is read out nondestructively, and no information can subsequently be recorded or written into this read-only optical disks; "Write-once" disks in which data can be written in addition to the permanently stored information, and the stored information is read out nondestructively; and "Erasable" disks in which information can be written or recorded and erased repeatedly. Among others, a great concern is given to the erasable optical disks to which the present invention pertains.

The erasable disks are classified into several types by processes used. These types include the "Phase change" type in which heat of a laser beam is used to create a phase change in an optical recording medium between the crystalline phase and the amorphous phase, and changes in reflective index in the phase change area are read out; the "Magneto-optic" type in which a recording layer is heated above the Curie temperature by means of a laser beam and while at the same time, a magnetic field is applied to change the magnetic polarization of pits, and changes in plane of polarization of light caused by Kerr effect are read out; the "Photochromic" type which is based on shifts in light absorption wavelength band observed when organic dyes are exposed to a light beam; and the "Double layer" type in which the heat of a laser beam is used to create and erase dome-like bumps. More detailed information is available, for example, from the article "Current Condition and Trend of Optical Disk Recording Materials", M. Kobukata et al., OPTRONICS (1987) No. 12.

The phase change disks have a drawback that pits tend to spread out due to thermal conduction of the optical recording medium when the disks are rotated at a low linear speed. The magneto-optic disks are also disadvantageous for its high material cost and the necessity of a complicated optical system. The photochromic disks have a problem for the deterioration of signals. With the difficulties in view, the present invention is directed to a double layer optical disk wherein information is written or recorded by the formation of dome-like protuberances or bumps.

The double layer optical disks include two types: One is composed of a first layer of metal or synthetic resin and a second layer of shape-memory alloy (hereinafter referred to as "metal-alloy" type); the other is composed of two layers of organic dyes having different absorption bands (hereinafter referred to "double layer organic dye" type). Typical examples of such double layer optical disks are disclosed in Japanese Patent Laid-open Publication Nos. 56-124136 and 60-69846.

Conventional erasable optical disks of the metal-alloy type and the double layer organic dye type will be described below with reference to FIGS. 10 and 11 and FIG. 12 of the accompanying drawings.

FIG. 10 is a cross-section of the conventional metal-alloy type erasable optical disk as it is in the initial or non-recorded state. FIG. 11 is a cross-section similar to FIG. 10, but showing the metal-alloy type in the recorded state. In FIG. 10, 101 is a clear or transparent substrate, 102 is a first layer of metal or synthetic resin, and 103 is a second layer of shape-memory alloy. In FIG. 11, 111 is a pit and 111 denotes a space.

The transparent substrate 101 is made of glass or synthetic resin having a low coefficient of linear thermal expansion and supports thereon the second layer of metal or synthetic resin having a high coefficient of linear thermal expansion. The shape-memory alloy layer 103 is formed over the second layer 102 of metal or synthetic resin.

From the backside of the transparent substrate 101 an intermediate power laser is irradiated on the first layer 102 of high coefficient of thermal expansion and the first layer 102 expands to thereby form a pit 111 and a space 112 as a result of formation of the pit 111. In this instance, the shape-memory alloy layer 103 is heated at a temperature below its melting point and hence undergoes plastic deformation with the result that the shape of the pit 111 is set. Erasure is performed by irradiating a high power laser beam on the shape-memory alloy layer 103 to heat the same to a temperature exceeding the transforming point of the martensitic phase. The second shape-memory allow layer 103 recovers its original shape so that the dome-like bump (pit) is erased.

FIG. 12 is a cross-section of a double layer organic dye type erasable optical disk. The optical disk consists of a substrate 121, a thermal expansion layer 122 having an absorption band at about 830 nm, and a retention layer 123 having an absorption band at about 780 nm. More concretely, the thermal expansion layer 122 is composed of an organic dye having an absorption band at about 830 nm and a viscoelastic binder (a synthetic resin). The thermal expansion layer 122 is formed as a first layer on one surface of the substrate 121 by the spin coat process. The retention layer 123 is composed of an organic dye having an absorption band at about 780 nm and a synthetic resin having a glass-transition temperature higher than that of the first layer 122. The retention layer 123 is formed as a second layer on an outer surface of the first layer 122 by the spin coat process. For recording, a laser beam of 830 nm is irradiated from the backside of the substrate 121 whereupon the first layer 122 having the absorption band of 830 nm is heated mainly. The first layer 122 thus heated undergoes thermal expansion to deform the retention layer 123 plasticly and to form a dome-like bump (or pit) for recording a signal. Erasing is performed by irradiating the second layer 123 with a laser beam having a wavelength of 780 nm. The second layer 123 having the absorption band of 780 nm is heated and becomes soft so that the dome-like bump (pit) is flattened or erased by residual stress stored in the thermal expansion layer 122.

The metal-alloy type erasable optical disk of the foregoing construction has a drawback that the first layer, as it is separated from the transparent substrate 101 in the recording process, is instable in shape and hence the size of the dome-like bumps is not uniform. In the erasing process, the space still exists between the transparent substrate 101 and the first layer 102, leading to an incomplete erasure. After erasing, the temperature of the shape-memory alloy layer 103 goes down while at the same time, the first layer 102 is still hot and expands again. This brings about an accidental recording of digital information. A further drawback involved in the metal-alloy type is that the shape-memory alloy layer 103 has a tendency to change into the amorphous phase when subjected to thermal shock during repeated recording (writing) and erasing operations. The life time of the metal-alloy type is relatively short.

The double layer organic dye type erasable optical disk has a drawback in that due to its structure composed of two synthetic resin layers, the thermal resistibility of this erasable optical disk is low and when used in the environment at a temperature above 70° C., a notable drop of carrier-to-noise (C/N) ratio takes place.

SUMMARY OF THE INVENTION

With the foregoing drawbacks of the prior art in view, it is an object of the present invention to provide erasable optical disk media which are durable enough to withstand repeated recording and erasing operations and are highly resistant to heat.

Another object of the present invention is to provide a method of recording/erasing for such erasable optical disk media, which enables formation of dimensionally stable pits on the disk media in the recording process and also enables complete erasure of the pits in the erasing process.

An erasable optical disk medium of the present invention generally consists of a double layer construction, that is a thermal expansion layer (first layer) formed of an organic dye and a binder, and a retention layer (second layer) of metal. The first layer has a light absorption band whose a peak level is substantially equal to or greater than the wavelength of a laser beam used in the recording process. The first layer further has a linear thermal expansion coefficient greater than $5 \times 10^{-5}/°C$ and a thermal conductivity less than $4 \times 10^{-1}$ kcal/mh°C. The second layer of metal has a melting point higher than the softening temperature of the first layer and not exceeding 600° C. and further has a breaking elongation over 15%. The erasable optical disk medium may include a compression layer as a third layer on the second layer and being softer than the first layer. Furthermore, an overcoat of a photo-setting resin may be formed over the third layer. In order to prevent incomplete erasure, it is possible to provide a thermal diffusion layer disposed between the transparent substrate and the thermal expansion layer, the thermal diffusion layer being formed a material selected from the group consisting of $SiO_2$, SiN, $Al_2O_3$ and diamond-like carbon (DLC). The binder is preferably formed of a rubber-like viscoelastic material.

A recording/erasing method of the erasable optical disk according to the present invention includes a recording process in which an intermediate power laser beam is irradiated from the backside of the transparent substrate onto a part of the first layer in the vicinity of the transparent substrate to thermally expand the first layer for forming a dome-like protuberance or bump in the second layer. In the erasing process, an area adjacent to the second layer is heated to a temperature near its melting point to soften the second layer, thereby flatten the dome-like bump by the tensile stress (residual stress) acting on the first layer. The heating may be achieved by employing a high power laser beam irradiated to the area either from the backside of the transparent substrate or from a side opposite to the transparent substrate, a flashing light or a continuous light irradiated from a side opposite to the transparent substrate, or a microwave heating.

As a practical erasing means other than those used for batch erasing, three semiconductor lasers are used for irradiating respective laser beams from the backside of the transparent substrate. The first laser beam generated by the semiconductor laser for reproducing has a wavelength shorter than the wavelength of the second laser beam generated by the semiconductor laser for recording. The wavelength of the second laser beam is shorter than the wavelength of the third laser beam generated by the semiconductor laser for erasing. An alternative erasing means includes a power dependent semiconductor laser in which instance defocus caused by wavelength shift depending on changes in input power is utilized. As a further alternative, two semiconductor lasers are used exclusively for the reproducing process and the recording/erasing process, respectively. The laser beam generated by the reproducing semiconductor laser has a wavelength shorter than the wavelength of the laser beam generated by the recording/erasing semiconductor laser. The recording/erasing semiconductor laser comprises a power dependent semiconductor laser in which the wavelength is shifted toward a longer wavelength side as the input power increases. As an alternative, in the reproducing and erasing processes, the laser beam is irradiated from a side opposite to the transparent substrate. In any case, the focal position of the laser beam in the erasing process is located near the metal retention layer.

In case of recording and erasing with the power dependent semiconductor laser, a tracking servo is incorporated. In this instance, a focus servo is de-activated during the erasing process. Alternatively, the average focal position in the recording, reproducing and erasing processes may be slightly offset toward the transparent substrate side.

As described above, the erasable optical disk medium of the present invention includes a thermal expansion layer (first layer) composed of an organic dye and a binder and coated on one surface of a transparent substrate, and a retention layer (second layer) of metal having a low melting point. The first layer has a thickness of 1 to several μm and also has an optical absorption band of a peak wavelength at least substantially equal to the wavelength of a laser beam used in the recording process. The erasable optical disk medium has a planar geometry as it is in the initial or non-recorded state.

In the recording process, an intermediate power laser beam is irradiated from the backside of the transparent substrate in such a manner that the focal point is located near the boundary between the first layer and the transparent substrate to heat the first layer to a temperature ranging from 150° C. to the melting point (max. 600° C.) of the second layer. In this instance, light energy of the laser beam is efficiently converted into heat energy due to excellent light absorption of the organic dye in the first layer. Since the binder has a linear expansion coefficient higher than $5 \times 10^{-5}/°C$., a large thermal expansion of 0.1 μm to zero point several μm is led for the first layer of 1 to several μm thick. With this large thermal expansion, the first layer locally deforms the second layer. Since the second layer of metal is not heated very much and the breaking elongation of the second layer is greater than 15%, the second layer undergoes plastic deformation to thereby form a dome-like protuberance or bump (pit). Due to the plastic deformation, the pit thus formed retains its shape even after the temperature of the first layer goes down. A signal is thus recorded in the disk medium. In this instance, due to the viscoelastic property of the binder, the first layer is held into intimate contact with the transparent substrate without a space therebetween and hence the pit has residual stress (tensile stress) stored in the first layer.

In the reproduction mode, a lower power laser beam is irradiated for reading differences in light reflectivity caused by the existence of the pit. During that time, the pit shape is maintained without deformation. The wavelength of the laser beam used in this reproduction mode must be of the band which is not absorbed by the first layer very much. To this end, a separate reproduction laser is provided, the reproduction laser having an oscillating wavelength which is lower than the light absorption wavelength band of the first layer. Alternatively, a power dependent laser may be employed in which instance the reproducing laser power is smaller than the laser power in the erasure mode, such as about 1 mW. The wavelength of the laser beam is slightly shifted toward the short wavelength side as compared to that of the record mode. This improves the permeability of the laser beam in the first layer and provides a large signal level.

In the erasing process, an area of the disk medium in the vicinity of the second layer is heated centrally so as to heat the metal layer of a low melting point to a temperature near the melting point, thereby softening the second layer. In this instance, the boundary between the first and second layers is heated. However, since the first layer has a low thermal conductivity and hence is not heated very much, the first layer does not undergo a large thermal expansion. Thus, the softening of the second layer causes the pit to be flattened by the residual stress acting on a portion of the first layer underlying the pit. A thermally conductive transparent film layer (thermal diffusion layer) may be disposed between the transparent substrate and the first layer in which instance the heat generated in an area of the first layer located in the vicinity of the transparent substrate is diffused by the thermal diffusion layer. With this heat diffusion, an incomplete erasure can be avoided. An advantageous effect is obtained when the thermal diffusion layer has a thermal conductivity greater than 1.0 kcal/mh°C.

The erasing process may be achieved either with a laser beam irradiated in a direction from the backside of the transparent substrate in the same manner as done in the recording and reproducing processes, with a laser beam irradiated in a direction from a side opposite to the transparent substrate in the same manner as done in the reproduction process (in which instance, the recording process is performed with a laser beam irradiated in a direction from the backside of the transparent substrate), with a flashing light or a continuous light irradiated from a side opposite to the transparent substrate so as to heat the entire surface of the second layer, or with a direct heating of the second layer with a microwave to perform batch erasure.

The first-mentioned erasing process includes an optical system provided for emitting a laser beam from the backside of the transparent substrate. The optical system is generally classified into three different types. The first optical system comprises three semiconductor lasers provided exclusively for the reproducing, recording and erasing processes, respectively. The laser beam generated by the reproducing semiconductor laser has a wavelength which is shorter than the wavelength of a laser beam generated by the recording semiconductor laser. The wavelength of the recording semiconductor laser is shorter than the wavelength of a laser beam generated by the erasing semiconductor laser. The second optical system comprises a power dependent semiconductor laser of the type wherein wavelength of the laser beam varies or shifts toward the longer wavelength side with an increase in input power. The third optical system includes two semiconductor lasers, one for the reproducing process having a wavelength shorter than that of the other semiconductor laser used for the recording and erasing processes. The other semiconductor laser comprises a power dependent semiconductor laser of the type which is the same the semiconductor laser incorporated in the second optical system. For use with these optical systems, it is preferred that the first layer has a higher absorbance to the laser beam during the recording process and a lower absorbance to the laser beam during the reproducing process. To this end, the first layer has an absorption band whose peak level is substantially the same as, or slightly shifted toward the longer wavelength side of, the wavelength of the recording laser beam.

According to the second-mentioned erasing process, irradiation of the laser beam is achieved from a side opposite to the transparent substrate both in the reproduction mode and the erasure mode. With this arrangement, the degree of freedom of selecting the wavelength for an erasing laser is very high. Furthermore, absorption of the laser beam does not take place in the first layer during the reproducing process so that a high carrier-to-noise (C/N) ratio is obtained. Since the organic dyes in the first layer has a function to convert light energy of the laser beam into heat, it is no longer necessary for the organic dye to produce changes in absorption band. The binder is preferably formed of a viscoelastic material which has a high transparency, a large linear expansion coefficient, a low thermal conductivity, and a large adhesion strength. The large linear expansion coefficient enables formation of a dome-like bump (pit) with a small quantity of heat. Furthermore, the low thermal conductivity enables formation of a pit which is small in size and large in height. With the first layer thus constructed, it is possible to obtain a high C/N ratio with a small laser power.

The second layer is formed of a metal having a relatively low melting point. This is because the use of a metal having a melting point over 600° C. results in a deterioration of the first layer with heat produced during irradiation of a laser beam. On the other hand, a lower limit for the melting point of the metal is 150° C. because a high reliability in the recording process is difficult to obtain when the melting point is lower than the softening point of the first layer. On the second layer, a protective compression layer and an overcoat may be provided in the order named.

In case of the semiconductor laser, wavelength is shifted toward the longer wavelength side by 5 nm to 10 nm when the power is changed from a low level of about 10 mW to a high level of about 20 mW. With this wavelength shift, the focal position is displaced rearward by several μm. Such displacement can be calculated numerically from the following equations (1) and (2).

$$f = k \cdot (n-1) \quad (1)$$

where f is a focal length m is a refractive index and k is a constant.

$$\Delta f = f_1 - f_0 \quad (2)$$
$$= k[1/(n_1 - 1) - 1/(n_0 - 1)]$$

Assuming that when the semiconductor shifts its wavelength from 780 nm to 790 nm, in a lens system having a refractive index $n_0 = 1.51075$ at the wavelength $\lambda_0 = 780$ nm and a refractive index $n_1 = 1.51051$ at the wavelength $\lambda_1 = 790$ nm, k of a collimating lens having a focal length of 9 mm is equal to 4.59675 as calculated by the equation (1). Substitution of k thus obtained and the refractive index at the wavelength of 790 nm into (1) gives the following focal length $f_{C1}$.

$$f_{C1} = 9.00423 \ mm$$

In similar manner, in case of an objective lens having a focal length of 3.9 mm, the focal length $f_{L1}$ is given as $$f_{L1} = 3.90183 \ mm$$

Thus, from the equation (2), we find that $\Delta f_C = 4.23 \ \mu m$ and $\Delta f_L = 1.83 \ \mu m$. On the other hand, the longitudinal magnification $\alpha$ of the optical system is given by the following equation.

$$\alpha = (f_{L1}/f_{C1})^2 = 0.18778$$

Accordingly, the amount of shift or displacement at the collimating lens side which appears as a shift or displacement at the objective lens side is presented by the following expression.

$$\Delta S = \Delta f_C \cdot \alpha = 0.79 \ \mu m$$

Thus, a total displacement is as follows.

$$\Delta S + \Delta f_L = 1.83 + 0.79$$
$$= 2.62 \ \mu m$$

The semiconductor laser having such a wavelength variable with the input power is generally regarded as a defective product, however, the present invention positively utilizes this phenomenon so as to control the position to be heated with a laser beam, thereby performing overwriting process.

When such defocus or focus offset is used, then a tracking servo must be provided. The tracking servo is activated only in the recording and reproducing processes while in the erasing process, such tracking servo is deactivated. In case of an optical disk rotated at 1800 rpm, the tracking of about 300 $\mu m$ takes place by inertia. Such tracking servo is satisfactory when used with a pit position memory system or a pit width memory system (PWM) employed in compact disks because a continuous erasure is unlikely to occur in these memory systems.

According to another method, the erasing process and the tracking stand together by previously displacing or offsetting the focal point toward the transparent substrate side. The tracking servo is activated in the recording, reproducing and erasing processes. The response time of the semiconductor laser which causes the wavelength shift in response to a change in input power is in the order of several nanoseconds and hence is considerably shorter than the signal recording time.

As described above, recording, reproducing and erasing can be achieved with the formation and erasure of a dome-like protuberance or bump. Since most of the thin film depositing operations are performed by a spin coat process, and further since use of expensive materials such as rare earth metals are not necessary, the erasable optical disks can be manufactured at a low cost. Furthermore, use of a power dependent semiconductor laser obviates the need for the provision of plural lasers. The optical system is therefore simple in construction as a whole.

The optical disks of the present invention, as opposed to the conventional disks of the double layer organic dye type, include a second layer of metal which enables the use of a first layer of a material having a higher softening temperature. The optical disks thus constructed are highly resistant to heat. Since the first layer of the optical disks is composed of a viscoelastic material, a good adhesion is provided between the viscoelastic first layer and the metal second layer. With this construction, there is no chance for the formation of a space between the transparent substrate and the first layer and also between the first layer and the second layer during the recording process. Furthermore, incomplete erasure can substantially be avoided.

As described above, the first layer of the optical disk comprises a thermal expansion layer (first layer) composed of an organic dye and a binder and having a high linear expansion coefficient, a low thermal conductivity, and a peak absorption level at least equal to the wavelength of a laser beam used in the recording process. The first layer is used in combination with a second layer composed of a retention layer of metal having a relatively low melting point. The first layer is thermally expandable to form a dome-like protuberance or bump whose shape is set by plastic deformation of the second layer, thus forming a pit to record a signal. The pit thus formed is erased by heating an area in the vicinity of the second layer for erasing the recorded information. The erasable optical disk media thus constructed has a high C/N ratio.

The thermal expansion layer does not involve formation of a space so that a complete erasure can be obtained without leaving partially erased traces. Furthermore, a noticeable increase in the number of recording-erasing cycles can be obtained.

The second layer formed of metal has a softening temperature higher than that of the synthetic resin and hence substantially improves the thermal resistibility and durability of the optical disk media of the present invention.

In case where a power dependent semiconductor laser having a large wavelength shift is used, only one laser device is needed for the optical system. The optical system is therefore simple in construction and compact in size. Furthermore, signal detection can readily be performed by merely reading changes in reflectance. The power dependent semiconductor laser used in combination with an organic dye having a highly sensitive absorption spectrum enables overwriting.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Figure 1:
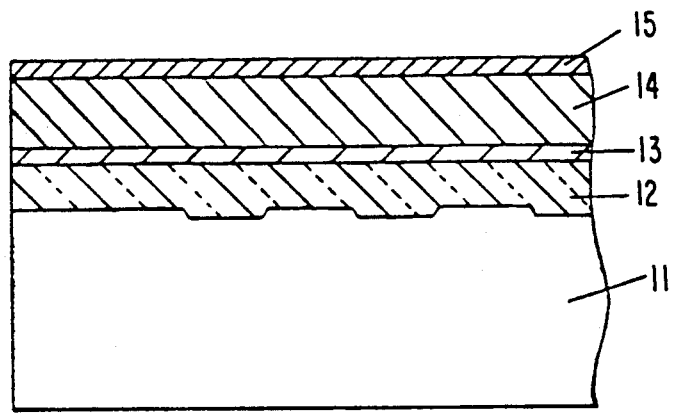
FIG. 1 is a cross-section of an erasable optical disk medium according to a first embodiment of the present invention.

Referring now to the drawings and FIG. 1 in particular, there is shown an erasable optical disk medium according to a first embodiment of the present invention.

Figure 3:
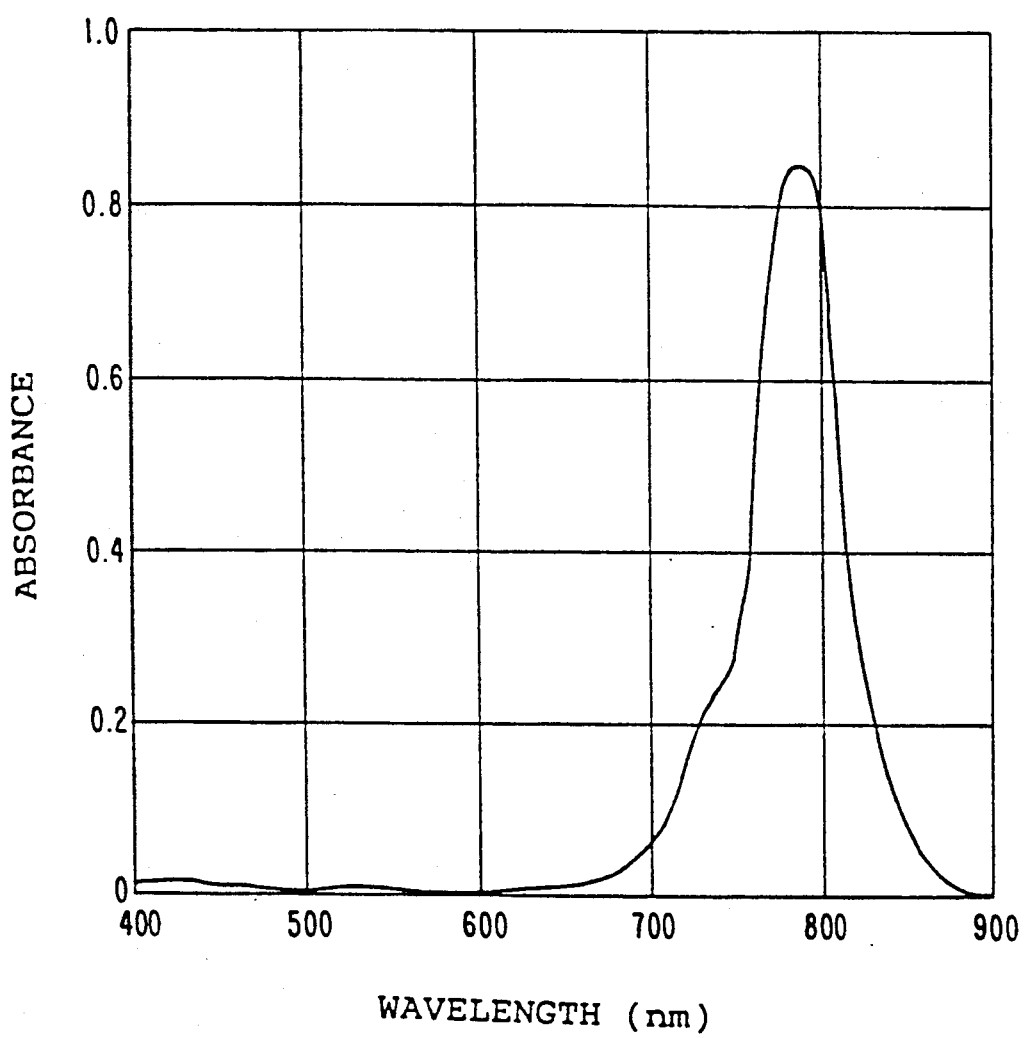
FIG. 3 is a graph showing the absorbance spectrum of a thermal expansion layer of the optical disk medium taken with respect to the wavelength.

The optical disk medium comprises a transparent substrate 11, a thermal expansion layer 12, a metal layer 13, a compression layer 14 and an overcoat 15 that are disposed one above another in the order named. The transparent substrate 11 is formed of a glass/2P (Photo Polymer) substrate having guide tracks of a photo-setting resin transferred from a stamper. The thermal expansion layer (first layer) 12 is composed of an organic dye and a binder and formed on one surface of the transparent substance 11 through a spin coat process at 2000 rpm. In the illustrated embodiment, the organic dye is CY-9 (tradename and manufactured by NIPPON KAYAKU CO., LTD.) of cyanine group having a peak absorption level at about 780 nm, and the binder is reactive silicone rubber KE108/RTV (tradename and manufactured by Shin-Etsu Chemical Co., Ltd.). The organic dye and chief material of silicone rubber are uniformly dissolved in 2-butanone (MEK), and thereafter a reactive agent is added to harden the silicone rubber. The proportion of the organic dye to the silicone rubber is about 1 percent by weight. A MEK solution of the silicone rubber and the organic dye is coated over the surface of the transparent substrate 11 through the spin coat process stated above. MEK is highly volatile and hence is no longer existent in the first layer after the spin coat process. The first layer 12 has a thickness of about 2.1 $\mu$m. As appears clear from FIG. 3, the first layer 12 has an absorbance spectrum curve including a sharply rising peak at 780 nm wavelength. Such sharp spectrum seemingly results from a low density of the organic dye. In the illustrated embodiment, the first layer 12 composed of an organic dye-binder layer has a linear expansion coefficient of $3.2 \times 10^{-4}/°C$. and a thermal conductivity of $1.4 \times 10^{-1}$ kcal/mh°C.

Eligible materials for the organic dye include diimonium dye, ethylene 1,2-dithiol metal(Ni) complex, cyanine dye such as phthalocyanine, squarilium dye, methine dye, naphthoquinone dye, quinonimine dye, quinonediimine dye, anthraquinone dye, and like dyes having an absorption band falling in near infra red band.

Materials suitable for the binder includes butyl rubber, ethylene copolymer, butadiene-styrene rubber, fluoride rubber or the like elastomer, cellulose acetate, polysulfonamide, cellulose nitrate, various acrylate resins of the like amorphous polymer.

The metal layer (second layer) 13 is formed of tin (melting point = 232° C., breaking elongation = 96%) deposited onto the first layer 12 through vapor deposition process. The tin layer thus formed has a thickness of about 0.3 $\mu$m.

Eligible materials for the second layer 13 include pure metals having low melting point such as indium (In), lead (Pb), zinc (Zn), aluminum alloy solder (stipulated by JIS-BA4144), low melting point silver alloy solder (stipulated by JIS-LM15) or the like alloy. More particularly, a cerro matrix alloy composed of Bi, Pb, Sn and Sb is particularly advantageous for its wide melting region which enables the use of a wide range of erasing power.

The second layer 13 of metal is deposited through a thin film vapor deposition process such as resistance heating evaporation, sputtering or EB (electron beam) deposition. In case of the alloy, deposition of the second layer is performed by a co-vapor deposition process or a co-sputtering process.

The second layer 13 of metal has a melting point which is higher than the softening temperature of the first layer 12 composed of an organic dye-binder layer and is lower than a thermal decomposition or degeneration temperature. That is, the melting point preferably is in the range of 150° C.-600° C. Furthermore, the second layer 13 has a breaking elongation not less than 15% so as to protect the first layer 12 against rupture even when a pit of 0.1 $\mu$m height against 1 $\mu$m diameter is formed in the second layer 13.

The compression layer 14 is formed of 3 $\mu$m thick butyl rubber coated over the second layer 13 through the spin coat process at 1500 rpm.

The overcoat 15 is formed of a photo-setting resin coated on the compression layer 14 through the spin coat process and hardened with ultraviolet-light irradiation.

Figure 2:
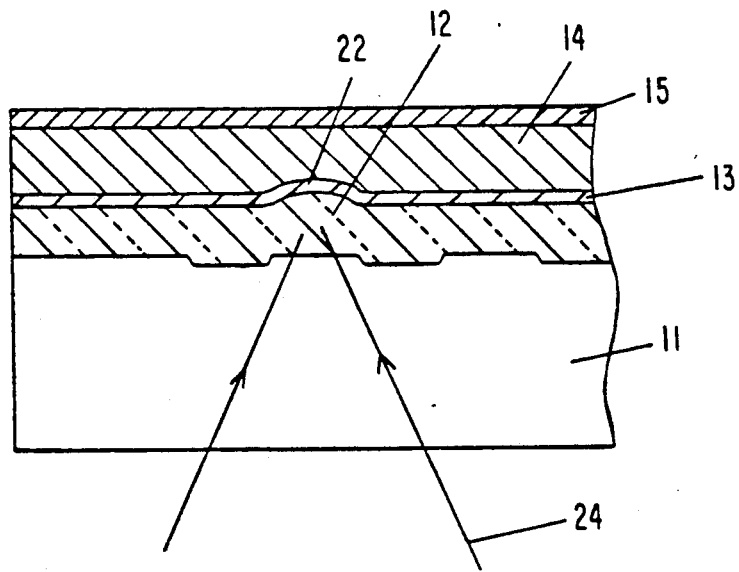
FIG. 2 is a cross-section similar to FIG. 1, but showing the optical disk as it is in the record (write) mode.

In use, the optical disk medium of the foregoing construction is rotated at a constant linear speed of 1.4 m/sec and while keeping this condition, the recording is done using a power dependent laser 24 (having wavelength 780 nm at 10 mW input power) is irradiated with 10 mW power onto the disk medium through the transparent substrate 11. During that time, laser 24 is focused on an area in the vicinity of a guide track between the transparent substrate 11 and the first layer 12, as shown in FIG. 2. Since the first layer 12 is a thermal expansion layer composed of the organic dye and a binder, the laser beam 24 is absorbed in the first layer 12 which in turn is heated at a portion slightly larger than the diameter of focus (abut 1 μm). Thus, the thermal expansion first layer 12 thermally expands so that a dome-like protuberance or bump of approximately 0.12 μm height is formed. In this instance, the second layer 13 of metal is not heated very much because of poor thermal conductivity of the first layer 12. Consequently, the dome-like thermal expansion of the first layer 12 forcibly deforms the second layer 13 into a dome-like configuration under such a low temperature condition. Since the dome-like bump is formed as a result of plastic deformation of the second layer 13, the shape of the bump is set when the temperature goes down. Thus, a pit 22 is formed in the disk medium. In this condition, a residual stress is stored in a portion of the first layer 12 including the pit 22 while compression stresses act on the corresponding portion of the compression layer 14.

Reproduction is performed by reading or detecting changes in magnitude of the reflected light returning from the disk medium when a 1.0 mW laser power is applied from the transparent substrate side of the disk medium. The irradiated laser beam has a wavelength of 770 nm. Since the pit 22 has a depth (or height) of 0.12 μm, interference and scatter of laser beam are caused by the pit 22, which leads to a considerable reduction of reflectance (refractive index = 1.4). As evidenced from FIG. 3, the first layer 12 shows a noticeable reduction in absorbance at 770 nm wavelength. The disk medium has high carrier-to-noise (C/N) ratio of 51 dB at a pit length of 0.9 μm.

Erasure is performed with a laser beam of 20 mW power irradiated from the transparent substrate side with a focus servo kept in the inactivated state. The irradiated laser beam has a wavelength of 790 nm and hence the focal point of the laser beam is shifted or transferred rearward by approximately 2.6 μm. With this shift of focal point, the metal retention layer (second layer) 13 of a low melting point is heated to a temperature near its melting point. As a result, the metal layer is softened and by the residual stress in the first layer 12 and compression stress in the compression layer 14, the pit 22 is flattened to thereby recover it initial planar geometry. The disk medium has a repeated recording-erasing cycles of about $5 \times 10^3$. The number of repeated cycles thus obtained is greater than that of the conventional metal-alloy type optical disk medium.

The results of an acceleration test performed under the condition of 80° C.80%RH indicate that no deterioration of C/N ratio is observed after 1000 hours. This is a clear contrast to the conventional double layer organic dye type disk medium in which a noticeable reduction of C/N ratio is observed at 70° C. environmental temperature. Thus, the disk medium of the present invention has high thermal resistibility and high environmental stability.

It has been proven that the C/N ratio, recording density and number of recording-erasing cycles are largely dependent on the linear thermal coefficient and thermal conductivity of the first layer.

Figure 4:
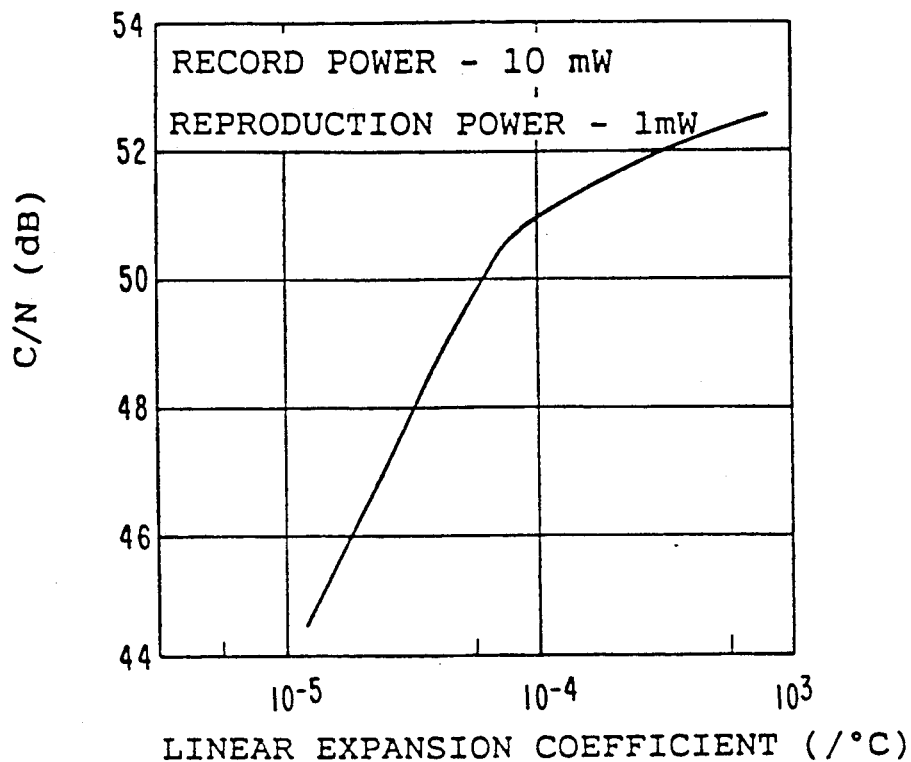
FIG. 4 is a graph showing the relationship between the linear expansion coefficient of the thermal expansion layer and the carrier-to-noise (C/N) ratio.
Figure 5:
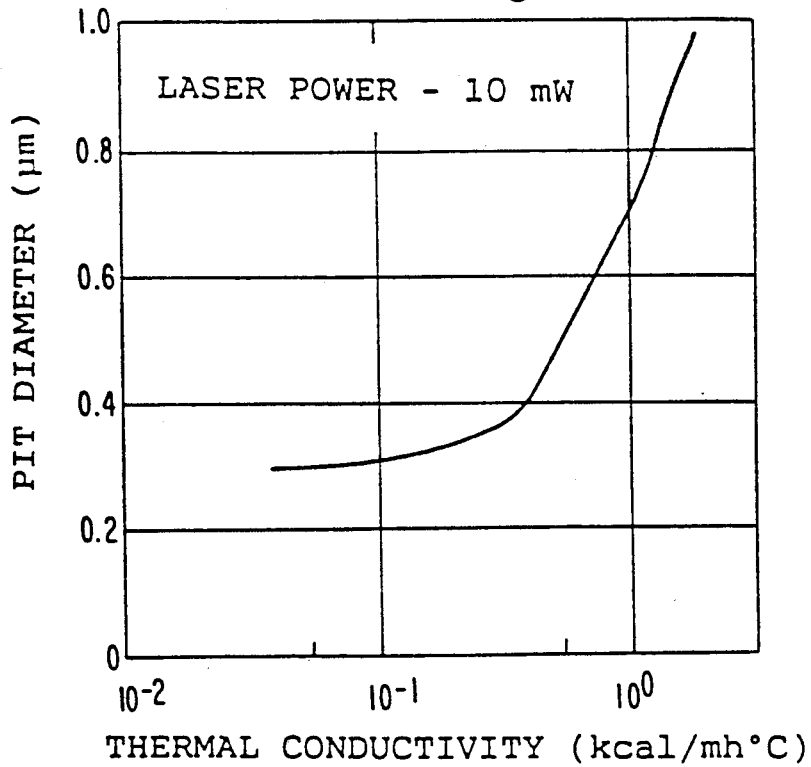
FIG. 5 is a graph showing the relationship between the thermal conductivity of the thermal expansion layer and the recording pit diameter.

FIG. 4 is a graphical representation of the relationship between the linear expansion coefficient of the first layer (thermal expansion layer) 12 and the C/N ratio. FIG. 5 is a graphical representation of the thermal conductivity of the thermal expansion layer 12 and the recording pit diameter. As appears clear from FIG. 4, a linear expansion coefficient not less than $5 \times 10^{-5}$/°C. is preferable. Similarly, FIG. 5 indicates that a thermal conductivity not exceeding $4 \times 10^{-1}$kcal/mh°C. is preferable.

Figure 6:
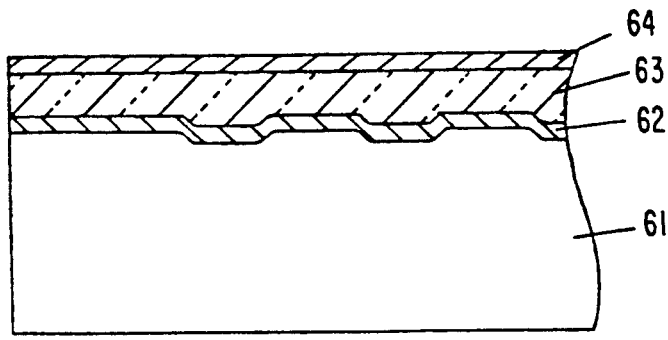
FIG. 6 is a cross-section of an erasable optical disk medium according to a second embodiment of the present invention.

FIG. 6 shows an erasable optical disk medium according to a second embodiment of the present invention. The disk medium includes a clear or transparent substrate 61, a thermal diffusion layer 62, a thermal expansion layer 63 and a metal layer 64 that are deposited one above another in the order named.

The transparent substrate 61 is formed of polycaronate substrate having injection-molded guide tracks. The thermal diffusion layer 62 is a diamond-like carbon layer of 0.3 μm thick formed through sputtering of carbon using a mixed gas of argon and 10% hydrogen. The diamond-like carbon layer 62 thus formed has a thermal conductivity of about 10 kcal/mh°C. Another method such as a plasma decomposition process, or an ion beam process may be used for the formation of the diamond-like carbon thermal diffusion layer 62. Typical examples of such deposition processes are taught by Naoji Fujimori and Akira Doi, Ceramics No.6, 523528 (1986).

The diamond-like carbon has a smaller crystalline phase than that of a diamond thin film formed through a chemical vapor deposition using methane gas or the like and hence its hardness and thermal conductivity are not as good as those of the diamond thin film. However, the diamond-like carbon is advantageous over the diamond thin film in that the thin film deposition process can be performed at a relatively low temperature and the resultant film has a uniform quality.

Eligible materials for the thermal diffusion layer 62 also include $SiO_2$, SiN, $Al_2O_3$ and forsterite, and preferably these materials have a thermal conductivity not less than 1.0 kcal/mh°C.

The thermal expansion layer 62 is composed of an organic dye and a binder and has a thickness of 2 μm. This layer is deposited onto the thermal diffusion layer 62 through the spin coating process in the same manner as done with the thermal expansion layer 12 of the first embodiment shown in FIGS. 1 and 2.

The metal layer 64 comprises 87% Pb and 13% Sb deposited onto the thermal expansion layer 63 through the co-vapor deposition process. The metal layer 64 thus formed is 0.4 μm thick and has a melting point of 249° C.

Recording is performed with a power dependent laser beam of 10 mW power (wavelength 780) irradiated onto the disk medium of the second embodiment rotating at a constant linear speed of 1.4 m/sec. A focus servo is activated throughout the recording, reproducing and erasing processes. Since signals to be recorded in the optical disk medium is modulated through various modulation methods such as EFM, the operation time of the respective signal is very short such as several hundreds nsec at longest. The operation time of the focus servo is larger than the operation time of the signals by two orders of magnitude and hence the focus servo cannot follow changes in input signals. Consequently, the focus is taken on an average position with respect to changes in wavelength caused during the recording, reproducing and erasing processes. In general, the focus is taken on a position intermediate between the focus point in the reproducing process and the focus point in the erasing process, that is an intermediate portion of the thermal expansion layer 63 consisting of an organic dye-binder layer. The focus servo is activated to offset the focus point in such a manner that the focus point is located in a position adjacent to the thermal expansion layer 63 and the thermal diffusion layer 62. With this focus offset, the thermal expansion layer 63 absorbs the laser beam irradiated and, due to heat absorbed therein, it thermally expands, thereby forming a dome-like protuberance or bump. The bump thus formed has a height of 0.14 μm. In this instance, the temperature of the metal layer 64 is still low so that the dome-like thermal expansion of the thermal expansion layer 63 causes the metal layer 64 to plastically deform into a dome-like pit (substantially identical to the pit 22 shown in FIG. 2). The pit is retained even when the expansion layer becomes cool after termination of the laser irradiation. Thus, the thermal expansion layer 63 holds a residual stress.

Reproduction is performed by reading or detecting changes in magnitude of the reflected light returning from the disk medium when a 1.0 mW laser power is applied from the transparent substrate side of the disk medium. The irradiated laser beam has a wavelength of 770 nm. Since the pit has a depth (or height) of 0.14 μm, it interferes with and scatters the laser beam, causing a considerable reduction of reflectance. The disk medium has high carrier-to-noise (C/N) ratio of 52 dB at a linear speed of 1.2 m/sec and a pit length of 0.9 μm.

Erasure is performed with a laser beam of 20 mW power irradiated from the transparent substrate side with a focus servo kept in the activated state. The irradiated laser beam has a wavelength of 790 nm so that absorption in the thermal expansion layer 63 is reduced to a certain extent and the focal point of the laster beam is shifted or transferred rearward by approximately 2.2 μm. With this focus shift, the temperature in the vicinity of the metal layer 64 rises to approximately equal to the melting point of the metal layer 64. Consequently, the metal layer 64 is softened and by the residual stress in the thermal expansion layer 63, the pit is flattened to thereby recover it initial planar geometry. In this instance, the thermal diffusion layer 62 serves to radiate heat from the disk medium for cooling the same. With the thermal diffusion layer 62 thus provided, the disk medium has high erasability and the number of repeated recording-erasing cycles of $2 \times 10^4$. The number of repeated cycles thus obtained is greater than that of the conventional metal-alloy type optical disk medium and of the conventional double layer organic dye type optical disk medium.

Figure 7:
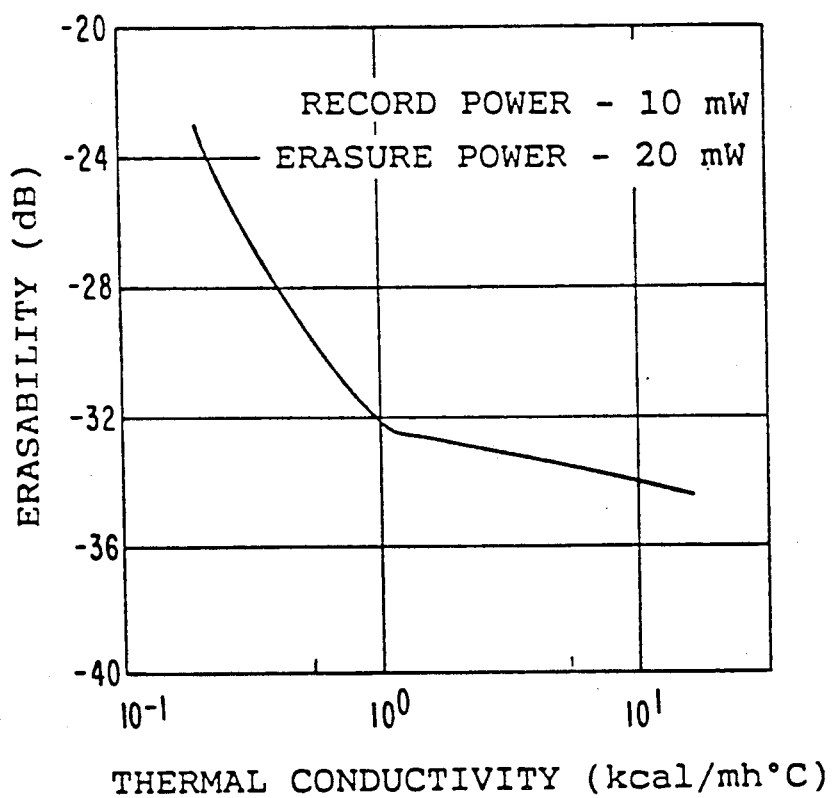
FIG. 7 is a graph showing the relationship between the thermal conductivity of a thermal expansion layer of the disk medium shown in FIG. 6 and the erasability.

FIG. 7 is a graph of the relationship between the thermal conductivity of the thermal expansion layer 63 and the erasability. As appears clear from FIG. 7, a noticeable increase in erasability is observed at a thermal conductivity above 1.0 kcal/mh°C. ($SiO_2$).

Figure 8:
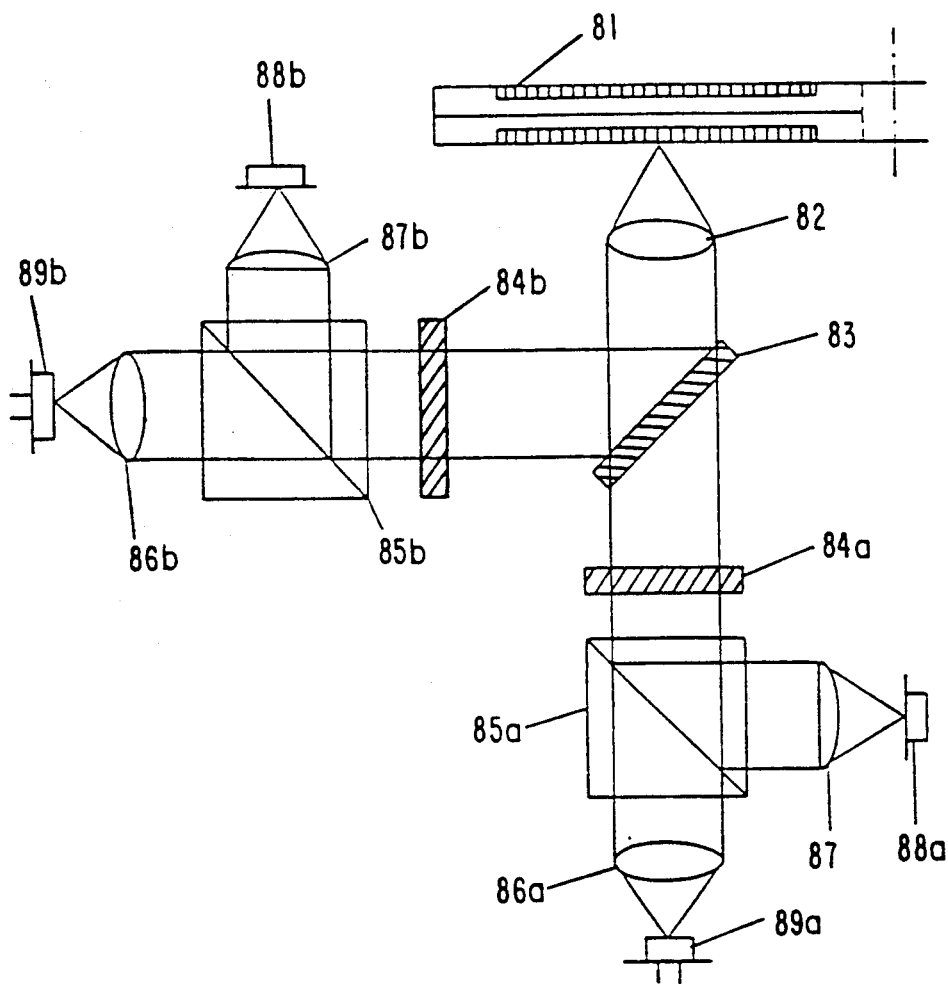
FIG. 8 is a diagram showing the general construction of an optical system according to a third embodiment of the present invention.

FIG. 8 diagrammatically shows the general construction of an optical system according to a third embodiment of the present invention.

The optical system includes an erasable optical disk medium 81, an objective lens 82, a dichroic mirror 83, two quarter wave plates 84a, 84b, two beam splitters 85a, 85b, two collimating lenses 86a, 86b, two cylindrical lenses 87a, 87b, two detectors 88a, 88b, a power dependent semiconductor laser 89a and a semiconductor laser 89b.

Though not designated, the disk medium 81 includes a thermal expansion layer (first layer) of 1.8 μm thick which is deposited on a transparent glass/2p substrate through a spin coat process using a solution of a metal complex organic dye (manufactured by Mitsui Toatsu Dyestuff Ltd. and sold under tradename PA1005) having a peak absorption level at 850 nm and silicone rubber KE108/RTV. The disk medium 81 further has a 0.3 μm metal layer of tin (Sn) deposited, as a second layer, onto the thermal expansion layer through a vapor deposition process. The erasable optical disk medium 81 of the foregoing construction has an absorbance peak at 850 nm.

Recording is performed by activating the power dependent semiconductor laser 89a with 10 mW to generate a laser beam oscillating at a wavelength of 830 nm. The laser beam thus generated passes successively through the collimating lens 86a, beam splitter 85a, quarter wave plate 84a, dichroic mirror 83 and objective lens 82 and reaches the erasable optical disk medium 81. During that time, the laser beam is concentrated by the objective lens 82 onto an area of the first organic dye-binder layer adjacent to the transparent substrate to thereby heat this area whereby a dome-like protuberance or bump is formed in the second layer. On the other hand, the reflected laser beam returning from the interface between the transparent substrate and the first layer passes successively through the objective lens 82, dichroic mirror 83 and quarter wave plate 84a and reaches the beam splitter 85a from which the reflected laser beam is refracted at an angles of 90 degrees toward the cylindrical lens 87a. The laser beam collected by the cylindrical lens 87a is guided to the detector 88a which in turn outputs tracking and focus servo signals. The dichroic mirror 83 is so constructed as to reflect only a light of a particular wavelength. In the illustrated embodiment, the dichroic mirror 83 reflects a light having a wavelength of 780 nm.

In the erasing process, the power dependent semiconductor laser 89a is empowered with 20 mW to generate a laser beam oscillating at a wavelength of 837 nm. The path of the laser beam is the same as the path of the laser beam in the recording process. Since the focus servo is inactivated, the focal position on the optical disk medium 81 is shifted from the focal position of the recording process toward the metal layer by about 1.5 pm.

Reproduction is performed with a laser beam of 780 nm wavelength generated by the semiconductor laser 89b. The laser beam thus generated passes successively through the collimating lens 86b, beam splitter 85b and quarter wave plate 84b and then is refracted by the dichroic mirror 83 into the objective lens 82 from which the laser beam is focused on the thermal expansion layer (first layer) of the optical disk medium 81. Since the absorbance of the first layer at the wavelength of 780 nm is relatively low, such as in the order of 15%, the reflectance varies depending on the presence of the pit in the second layer. In a recorded area in which pits exist, the quantity of reflected light is reduced. The reflected light returning from the second layer and the reflected light returning from the guide tracks pass through the objective lens 82 and then they are refracted by the dichroic mirror 83 at right angles toward the quarter wave plate 84b from which the reflected light advances through the beam splitter 85b and the cylindrical lens 87b toward the detector 88b. The detector 88b, upon arrival of the reflected light, detects information signals and tracking and focus servo signals. The semiconductor laser 89b used for the reproducing process preferably is of the type capable of producing a laser beam of the shortest possible wavelength in order to reduce absorbance in the first layer.

With the use of two semiconductor lasers 89a, 89b, the C/N ratio is increased to 54 dB (pit length=0.9 μm). And the number of recording-erasing cycles reaches to a level above $5 \times 10^3$.

Description will be given to a fourth embodiment of the present invention. The erasable optical disk medium used in this embodiment is the same as that in the second embodiment shown in FIG. 6. The optical system used in this embodiment is substantially the same as that in the third embodiment shown in FIG. 8, excepting that an optical system composed of a semiconductor laser, a collimating lens, a beam splitter, a quarter wave plate, an objective lens, a cylindrical lens and a detector is provided exclusively for each of the recording, reproducing and erasing processes. Three optical systems are all located on the transparent substrate side. The semiconductor laser used for the recording process generates a laser beam with a wavelength of 830 nm (at 8 mW input power). The semiconductor laser used for the reproducing process is capable of generating a laser beam with a wavelength of 780 nm (at 1 mW input power). And, the semiconductor laser used for the erasing process generates a laser beam oscillating at a wavelength of 860 nm (at 9 mW input power). With these three lasers thus provided, the entire optical system is complicated in construction to a certain extent. However, it is possible to increase the absorbance only in the recording process, thereby providing a higher C/N ratio. With this arrangement, a C/N ratio of 56 dB at a recording pit length of 0.9 μm and at a linear speed of 1.4 m/sec, and more than $10^4$ repeated recording-erasing cycles are obtained.

Figure 9:
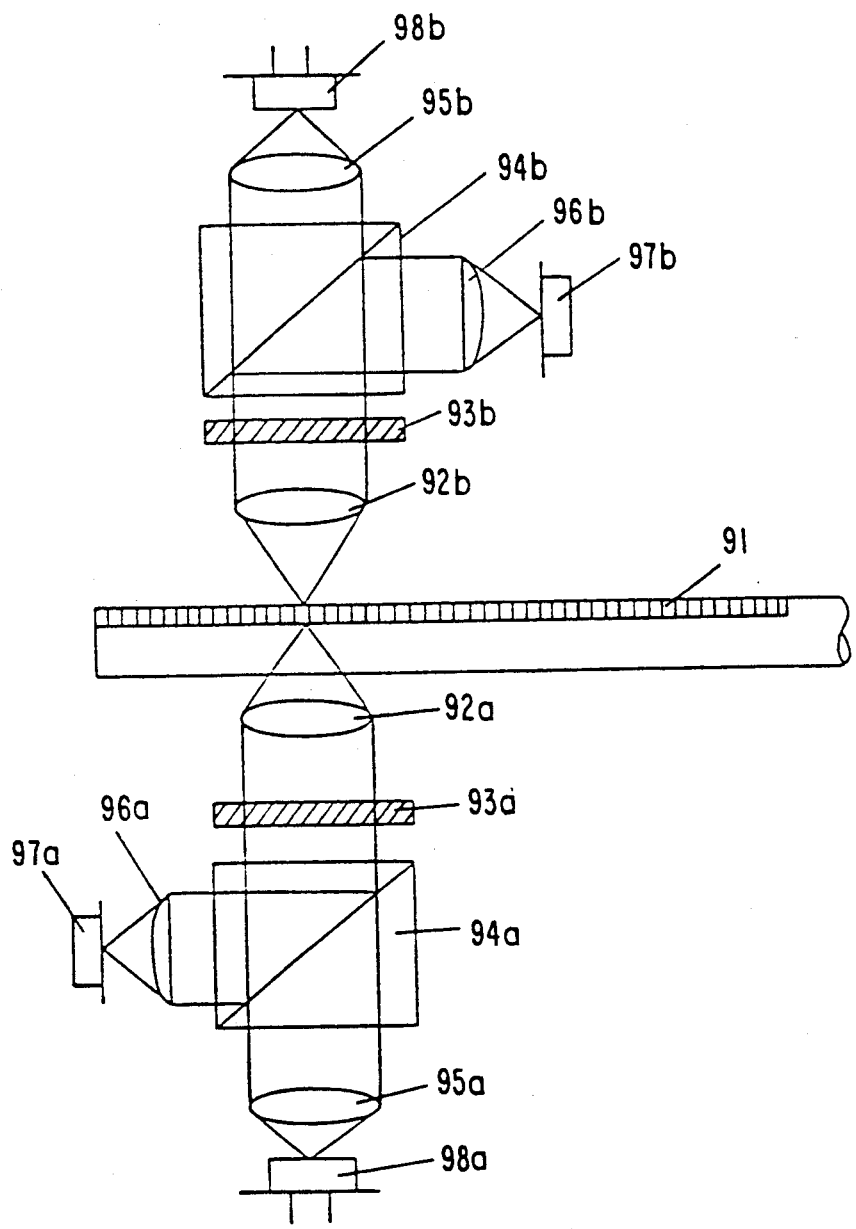
FIG. 9 is a diagram similar to FIG. 8, but showing the general construction of an optical system according to a fourth embodiment of the present invention.
Figure 10:
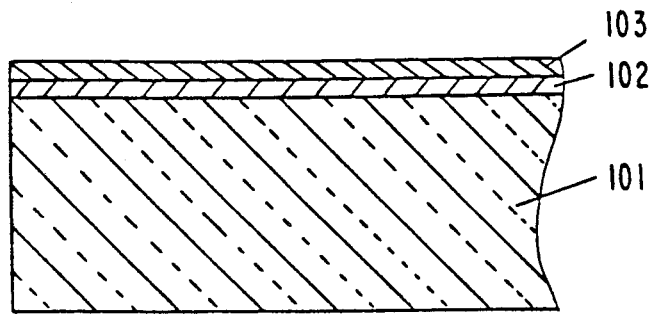
FIG. 10 is a cross-section of a conventional metal-alloy type optical disk medium as it is in the initial non-recorded condition.
Figure 11:
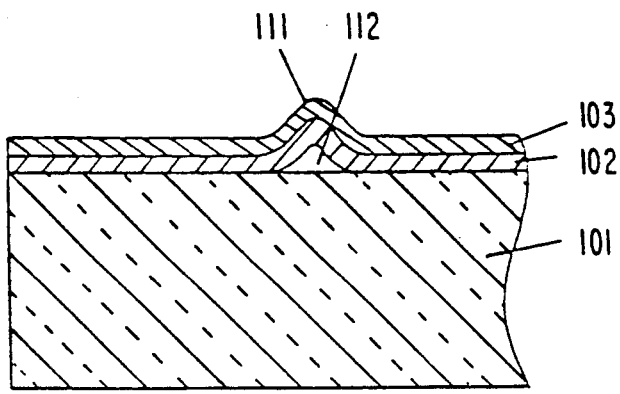
FIG. 11 is a cross-section similar to FIG. 10, but showing the metal-alloy type optical disk medium as it is in the record mode.
Figure 12:
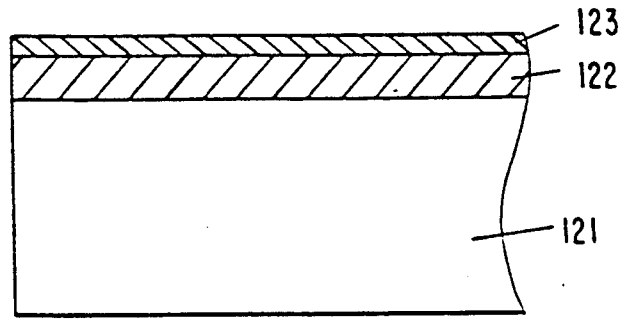
FIG. 12 is a cross-section of a conventional double layer organic dye type optical disk medium.

FIG. 9 diagrammatically shows the general construction of an optical system according to a fifth embodiment of the present invention.

The optical system includes an erasable optical disk medium 91, two objective lenses 92a, 92b, two quarter wave plates 83a, 83b, two beam splitters 94a, 94b, two collimating lenses 95a, 95b, two cylindrical lenses 96a, 96b, two detectors 97a, 97b, and two semiconductor lasers 98a and a semiconductor laser 98b.

Though not designated, the disk medium 91 includes a thermal expansion layer (first layer) of 1.8 μm thick which is deposited on a transparent glass/2p substrate through a spin coat process at 2000 rpm using a solution of a diimonium organic dye (manufactured by NIPPON KAYAKU CO., LTD. and sold under tradename IRG-022) having an absorbance peak in the range of 800–1000 nm, and silicone rubber KE108/RTV. The disk medium 91 further has a 0.3 μm metal layer of indium (In) having a melting point of 156.6° C. which is deposited, as a second layer, onto the thermal expansion layer through a vapor deposition process. By using such optical disk medium 91, in the recording process the laser beam is irradiated from the transparent substrate side, while in the reproducing and erasing processes the laser beams are irradiated from a direction opposite to the transparent substrate.

Recording is performed by activating the semiconductor laser 98a with 10 mW input power to generate a laser beam with a wavelength of 830 nm. The laser beam thus generated passes successively through the collimating lens 95a, beam splitter 94a, quarter wave plate 93a, and objective lens 92a and reaches the erasable optical disk medium 91 form the transparent substrate side thereof. During that time, the laser beam is concentrated by the objective lens 92a onto the first organic dye-binder layer to thereby heat the same whereupon a dome-like protuberance or bump is formed in the second layer. On the other hand, the reflected laser beam returning from the interface between the transparent substrate and the first layer passes successively through the objective lens 92a and quarter wave plate 93a and reaches the beam splitter 94a from which the reflected laser beam is refracted at an angles of 90 degrees toward the cylindrical lens 96a. The laser beam collected by the cylindrical lens 96a is guided to the detector 97a which in turn outputs tracking and focus servo signals.

In the reproducing and erasing processes, a laser beam is irradiated directly onto the pits on the second layer. The semiconductor laser 98b is empowered with 1.0 mW input power in the reproducing process, and with 6 mW in the erasing process so as to generate a laser beam with a wavelength of 830 nm. The laser beam thus generated passes successively through the collimating lens 95b, beam splitter 94b, quarter wave plate 93b and objective lens 92b and then is concentrated on the pit formed in the second layer. In the erasure process, the second layer is heated with the laser beam to a temperature near its melting point whereupon the second layer is softened and the pit is flattened by residual stress stored in the first layer. Thus, recorded digital information is erased. On the other hand, the reflected light returning from the second layer passes through the objective lens 92b and the quarter wave plate 93b and then is refracted by the beam splitter 94b at right angles toward the cylindrical lens 96b. The cylindrical lens 96b concentrates the reflected light onto the detector 97b which in turn detects information signals, focus servo signals, and tracking signals.

With this arrangement, a C/N ratio of 55 dB is attained when the linear speed is 1.4 m/sec and the recording pit length is 0.9 μm. Since indium used for the formation of the second layer has a low melting point, only a small laser power is needed. Furthermore, since in the erasing process the laser beam is irradiated from the direction opposite to the transparent substrate, absorption of the laser beam by the organic dye in the first layer does not take place. This arrangement seemingly leads to the C/N ratio stated above.

It has experimentally been proved that batch erasure of the entire pits or recorded information is possible by using any one of the following methods in combination with the erasable optical disk media and the optical systems disclosed herein with reference to the foregoing embodiments. These batch erasing methods include (a) irradiating a side of the disk medium opposite to the transparent substrate, with a flashlight for camera, (b) continuously illuminating a side of the disk medium opposite to the transparent substrate, with a light (about 100 W) for about one minute, and (c) heating the disk medium in a microwave oven KZ-20DT (manufactured by Matsushita Electric Industrial Co., Ltd.) at 1200 W for about one minute.

The compression layer and the overcoat lying over the second layer (retention layer) of metal of a low melting point have little influence on the performance characteristics of the disk medium, however, they are practically effective for the purpose of protection of the disk media while in use.

Obviously various minor changes and modifications of the present invention are possible in the light of the above teaching. It is therefore to be understood that within the scope of the appended climes the invention may be practiced otherwise than as specifically described.

What is claimed is:

1. An erasable optical disk medium, comprising:
   a transparent substrate;
   a thermal expansion layer disposed on said transparent substrate and composed of an organic dye and a binder, said thermal expansion layer having a light absorption band having a peak wavelength larger than the wavelength of a laser beam used in a recording process of said erasable optical disk medium, said peak wavelength ranging between 600 and 900 nm, said thermal expansion layer being formed of a viscoelastic material having a linear thermal expansion coefficient greater than $5 \times 10^{-1}$ kcal/mh°C.; and
   a retention layer of metal disposed on said thermal expansion layer and having a breaking elongation over 15%, said metal having a melting point greater than a temperature at which said thermal expansion layer softens and less than 600° C.

2. An erasable optical disk medium as claimed in claim 1, wherein said viscoelastic material has a thermal conductivity greater than $2 \times 10^{-1}$ kcal/mh°C, less than $4 \times 10^{-1}$ kcal/mh°C.

3. An erasable optical disk medium as claimed in claim 1, further including a thermal diffusion layer disposed between said transparent substrate and said thermal expansion layer, said thermal diffusion layer having a thermal conductivity greater than 1.0 kcal/mh°C. and less than $2 \times 10^2$ kcal/mh°C.

4. An erasable optical disk medium as claimed in claim 3, wherein said thermal diffusion layer is formed a material selected from the group consisting of $SiO_2$, $SiN$, $Al_2O_3$ and diamond-like carbon said diamond-like carbon further comprising a thin film formed by sputtering carbon and having a thermal conductivity of from 6 to 50 kcal/mh°C.

5. A method of recording/erasing an erasable optical disk medium having a double layer structure composed of a thermal expansion layer and a retention layer of metal, said method comprising the steps of:
   heating the thermal expansion layer of the erasable optical disk medium by directing a source of energy at a portion of said thermal expansion layer to thermally expand the same for causing the metal retention layer to plastically deform to form a bump, thereby performing the recording process;
   reading changes in reflectivity of the bump and an area surrounding the bump, thereby performing reproducing process; and
   heating the metal retention layer by directing a source of energy at a portion of said metal retention layer for softening said metal retention layer and causing the bump to be flattened by a tensile stress stored in the thermal expansion layer, thereby performing the erasing process.

6. A method as claimed in claim 5, wherein said heating in the recording process is achieved by directing a laser beam of an intermediate power to the backside of the transparent substrate for heating the thermal expansion layer to expand the same in such a manner as to plastically deform the metal retention layer to form a dome-like bump constituting a pit in the metal retention layer, thus recording a signal, said reading in the reproducing process is performed with a low power laser beam that is detected, as a signal, by differences in reflectivity from the pit and an area surrounding the pit while the pit is kept stable against deformation, and said heating in the erasing process is achieved by directing a laser beam of not less than said intermediate power to an area of the metal retention layer including the pit so as to heat the area to a temperature above the softening temperature of the metal retention layer for flattening the dome-like bump by the use of residual stress acting on the thermal expansion layer, thereby erasing the pit.

7. A method as claimed in claim 6, wherein said laser beams are irradiated from the backside of the transparent substrate, and said reproducing, recording and erasing processes comprise activating first, second and third semiconductor lasers provided exclusively for the reproducing, recording and erasing processes, respectively, said first semiconductor laser is capable of generating a laser beam having a wavelength shorter than the wavelength of a laser beam generated by said second semiconductor laser, said third semiconductor laser is capable of generating a laser beam having a wavelength longer than the wavelength of the laser beam generated by said second semiconductor laser.

8. A method as claimed in claim 6, wherein said laser beams are irradiated from the backside of the transparent substrate, said reproducing comprises activating a first semiconductor laser, and said recording and erasing comprise activating a second semiconductor laser, said first semiconductor laser being capable of generating a laser beam having a wavelength shorter than the wavelength of a laser beam generated by said second semiconductor laser, said second semiconductor laser comprising a power dependent semiconductor laser capable of generating a laser beam of a varying wavelength which increases with an increase in input power.

9. A method as claimed in claim 6, wherein the laser beams are irradiated from the backside of the transparent substrate, said recording, reproducing and erasing processes comprising activating a power dependent semiconductor laser capable of producing a laser beam having a varying wavelength which increases with an increase in input power, the wavelength of the laser beam generated in the erasing process being longer than the wavelength of the laser beam generated in the recording process, said wavelength of the leaser beam generated int he recording process being longer than the wavelength generated in the reproducing process, said laser beam generated in the recording process being substantially focused on the thermal expansion layer, said laser beam generated in the erasing process being substantially focused on the metal retention layer.

10. A method as claimed in claim 5, wherein said recording process includes irradiating a laser beam from the backside of the transparent substrate to the thermal expansion layer, and said erasing process includes irradiating a laser beam to the retention layer from an opposite side to the transparent substrate.

11. A method as claimed in claim 5, wherein said recording process comprises irradiating a laser beam of an intermediate power from the backside of the transparent substrate to the thermal expansion layer to form a dome-like bump for recording a signal, and said erasing process comprises irradiating the entire surface of the retention layer with one of a flashing light beam and a continuous light beam applied thereto from an opposite side to the transparent substrate for erasing a number of recorded signals simultaneously.

12. A method as claimed in claim 5, wherein said recording process comprises irradiating a laser beam of an intermediate power from the backside of the transparent substrate to the thermal expansion layer to form a dome-like bump for recording a signal, and said erasing process comprises applying a microwave to the transparent substrate to heat the metal retention layer for softening the same, thereby erasing a number of recorded signals simultaneously.

13. A method as claimed in claim 9, wherein said erasing process includes de-activating a focus servo, and said recording and reproducing processes include activating the focus servo.

14. A method as claimed in claim 13, wherein the focal point is previously offset slightly in the direction of the transparent substrate when the focus servo is activated.

* * * * *